May 12, 1970  E. MACK  3,511,485
FURNACES FOR PROCESSING EXPANDABLE VOLCANIC ROCK
Filed May 17, 1968  2 Sheets-Sheet 1
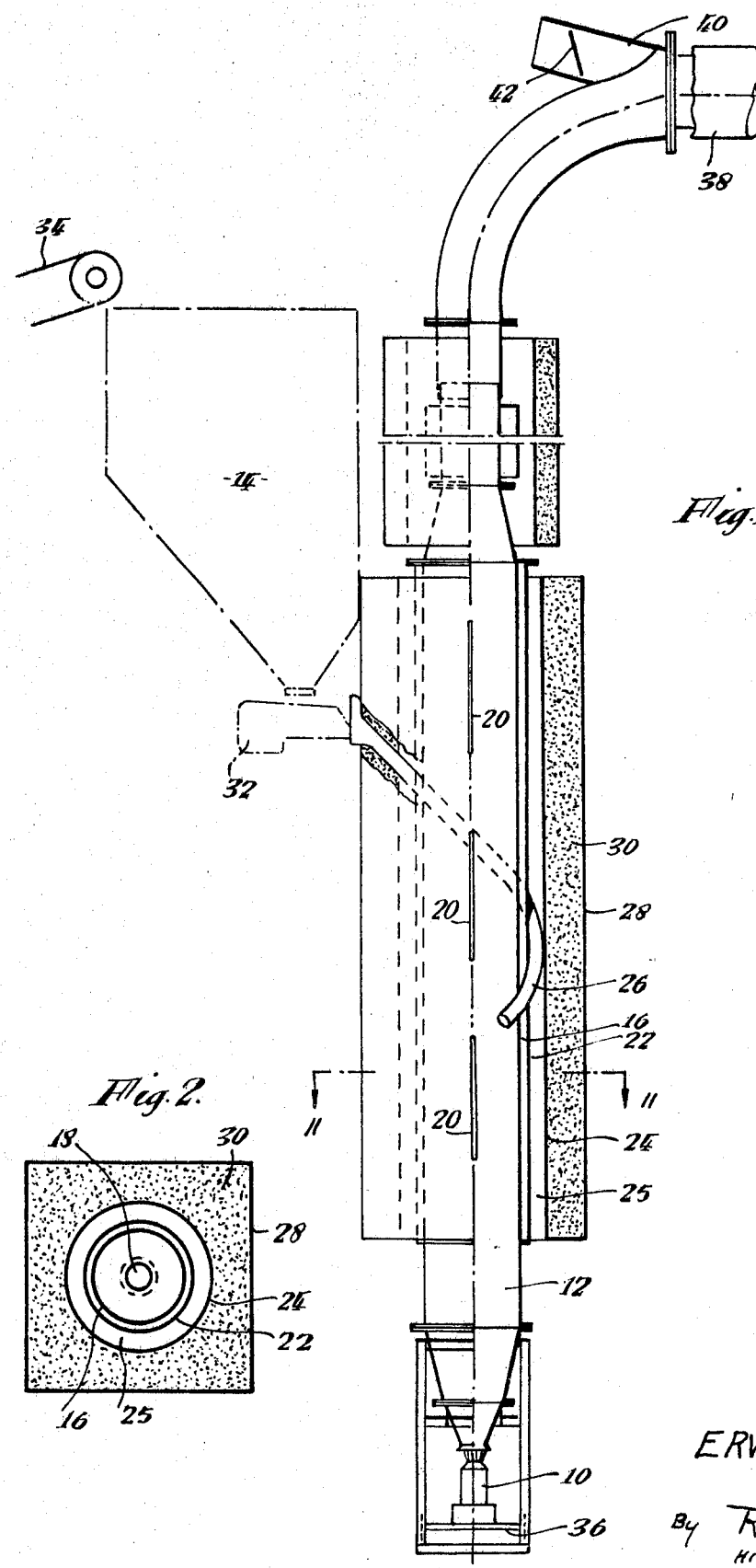
ERWIN MACK
INVENTOR
BY Rauber & Lezar
HIS ATTORNEYS

United States Patent Office 3,511,485
Patented May 12, 1970

3,511,485
FURNACES FOR PROCESSING EXPANDABLE VOLCANIC ROCK
Erwin Mack, Athens, Greece, assignor to British & Overseas Minerals Limited, London, England, a company of Great Britain and Northern Ireland
Filed May 17, 1968, Ser. No. 730,005
Claims priority, application Great Britain, May 22, 1969, 23,573/67
Int. Cl. F27b 7/14
U.S. Cl. 263—21                         5 Claims

ABSTRACT OF THE DISCLOSURE

A furnace for processing expandable volcanic rock having a combustion chamber in the form of a long tube arranged above a burner. The crushed rock to be expanded enters the processing chamber at a point intermediate the ends thereof from a spiral tube enveloping the inner casing of the processing chamber whereby the rock is preheated before entering the chamber. The rock on entering the processing chamber falls downwardly under the action of gravity until expansion has taken place, whereupon it is carried upwardly with the gases of combustion and is separated therefrom in a separating unit. To obtain even conditions of combustion through the length of the processing chamber, longitudinal slits are provided therein through which extra air or gas is admitted.

FIELD OF THE INVENTION

The present invention relates to improvements in furnaces for processing expandable volcanic rock. More particularly it relates to a furnace for expanding volcanic rock known as perlite.

It is known that perlite is a particularly difficult substance to process in a furnace, and satisfactory results can only be obtained by the accurate control of the furnace atmosphere. If the furnace conditions are not just right the perlite is either under expanded in which case its specific gravity is too high for industrial use or it is over expanded in which case it is too fluffy and brittle to be of any industrial use.

PRIOR ART

One furnace for achieving a good quality perlite is described in our U.S. Pat. No. 3,201,099. This patent relates principally to a burner for preparing a suitable combustion atmosphere. The top end of the burner in which the atmosphere is prepared by the rotary mixing of fuel and air is connected to a long vertical processing chamber, the perlite to be expanded being introduced into the top of the processing chamber. As the perlite falls through the processing chamber it becomes heated and expands. It is then carried off with the upwards draught produced by the burning gases. The under expanded perlite drops right through the processing chamber and is removed with the dross.

SUMMARY OF THE INVENTION

It is an object of the present invention to improve on the construction of the plant and in particular the construction of the processing chamber itself and the way in which the volcanic rock to be expanded is introduced into the processing chamber.

It is a further object of the invention to provide a furnace in which the conditions in the processing chamber are such that the perlite is neither over expanded, too brittle and fluffy nor under expanded and having a specific gravity to high for commercial use.

According to the present invention there is provided a furnace for the processing of volcanic rock including in combination a burner for producing a combustible conditioned atmosphere, a vertical processing chamber in the form of a long tube open at the top and bottom up through which the burning gases pass from the burner, at least two casings surrounding the processing chamber, heat insulating material located between the casings, a hopper containing the crushed volcanic rock to be processed, crushed rock conveying means located between said hopper and a point in the processing chamber intermediate the ends thereof and passing through said casings, means for preheating the crushed rock whilst in said conveying means and means for extracting the expanded rock from the burnt gases.

The tube of the processing chamber may have longitudinal slits in the wall thereof to permit the introduction of air or gas to obtain an even conditioned combustion throughout its length. The slits are preferably arranged in a line along the length of the tube.

The processing chamber may be surrounded by three casings, the inner two of which are concentric and cylindrical, said heat insulating material being located between the middle and outer casings.

The crushed rock conveying means and the preheating means may consist of a spiral tube in contact with the walls of the two inner concentric casings.

DESCRIPTION OF DRAWINGS

The present invention will now be described in greater detail by way of example with reference to the accompanying drawings, wherein:

FIGS. 1A and 1B show elevation views (partly in section) of a preferred form of furnace for expanding perlite; and FIG. 2 is a section on the line II—II of FIG. 1.

DESCRIPTION OF PREFERRED EQUIPMENT

Figure 1B:
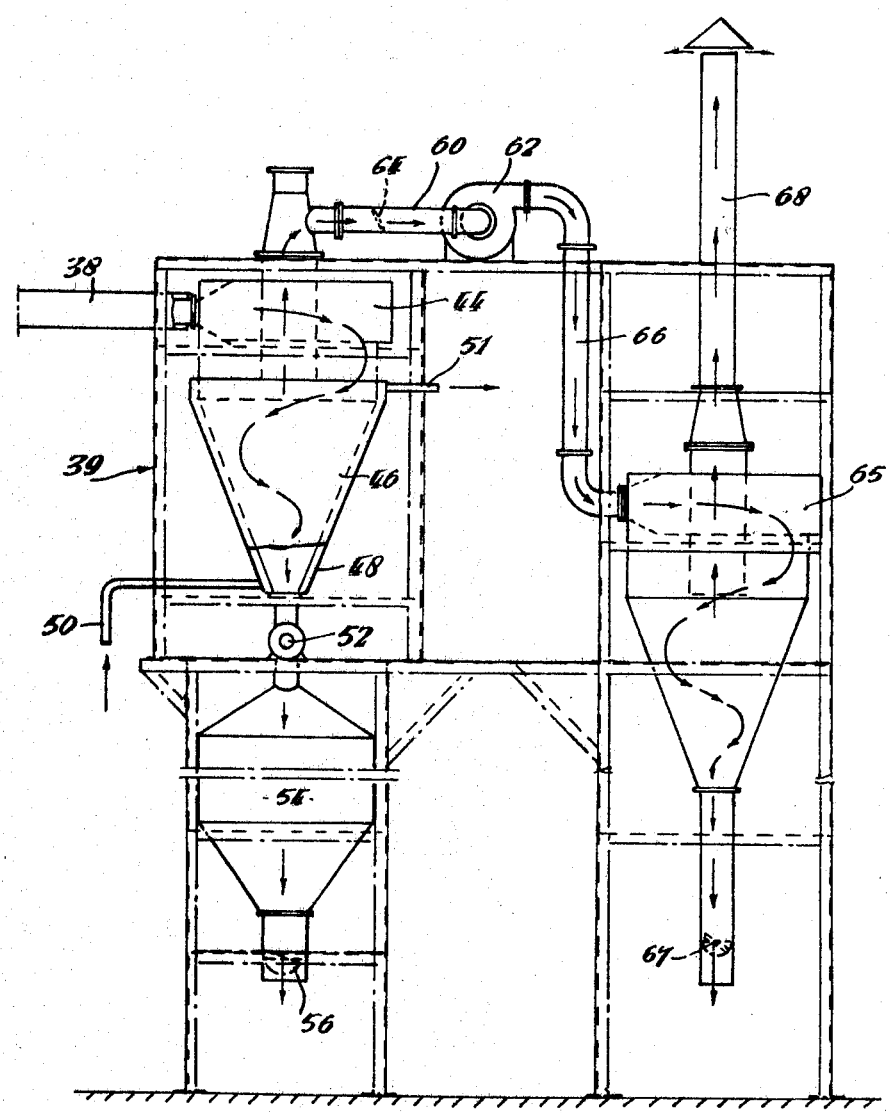

Referring to the drawings, the furnace essentially comprises a burner 10, a processing chamber 12, means for introducing crushed volcanic rock into the processing chamber including a hopper 14, and means for extracting the expanded perlite from the burnt gases of combustion. The processing chamber 12 consists of a high temperature steel tube 16 which tapers at both ends and in which the perlite expands. The bottom end tapers to a nozzle portion 18 below which is placed the burner 10. This forms an inverted double conical inlet which has the effect of increasing the upward draught, thereby enabling insufficiently expanded particles of rock to rise instead of fall. The steel tube 16 forming the outer boundary of the processing chamber 12 is provided with longitudinal slits 20 through which preheated air or a fuel gas such as butane may be supplied for the purpose of enriching the atmosphere and for the purpose of controlling the temperature at various points. In the example given, three slits 20 are arranged one above the other, i.e. in a line along the length of the tube. The steel tube 16 is surrounded by a first cylindrical casing 22 which is completely gas tight except for the admission of extra gas or air as mentioned above. A second cylindrical casing 24 concentrically surrounds the first casing. In the space 25 between the two cylindrical casings 22 and 24 there is provided a spiral pipe 26, the lower end of which projects through the first cylindrical casing 22 and the steel tube 16. The spiral pipe 26 is in contact with the first cylindrical casing 22 for the purpose of preheating the crushed rock. The upper end of this spiral pipe 26 projects through the second cylindrical casing 24 and a third outer casing 28 having a square cross section (as shown) or cylindrical cross section and arranged centrally around the other two casings. Insulating material 30 is packed in between the second and third casings. The upper end of the pipe 26 is connected to a feed mechanism 32 above which is mounted the hopper 14, the upper end of which is open for receiving crushed volcanic rock from a conveyor belt 34 (as shown) or elevator.

The burner 10 is mounted underneath the nozzle 18 at the lower end of the steel tube 16 constituting the processing chamber 12. The burner 10 may be of any known type which is fired with either oil or gas. It may be of the type as described in our U.S. Pat. No. 3,201,099 in order to ensure an adequate mixing of the fuel with the air of combustion. The air is preferably blown into the burner under pressure by means of a fan. In addition, the burner is arranged on a platform 36 so that it can be raised and lowered thus adjusting the gap between the burner 10 and the nozzle 18 at the lower end of the steel expansion tube 16 and so control the rate of combustion.

The upper end of the steel tube 16 is connected to a horizontal pipe 38 which carries the burnt gases of combustion and the fully expanded perlite to a separating unit 39 in which the perlite can be extracted. In order to cool the gases as they come out of the processing chamber 12 an air inlet pipe 40 is provided at the beginning of the horizontal pipe 38 so that a small but variable amount of cold air can be mixed with the burnt hot gases. A damper 42 provided in the pipe 40 controls the quantity of cold air admitted. The perlite separating unit 39 consists of a cylindrical upper portion 44 and a conical lower portion 46, the lower portion 46 being fitted with a cooling water jacket 48 having inlet and outlet valves 50 and 51 at the bottom and top respectively for cooling the gases and expanded perlite. An outlet valve 52 is provided at the lower end of the conical portion 46 of the separator through which the expanded perlite can be extracted and allowed to drop into a storage bin 54 placed immediately thereunder. The lower end of the storage bin 54 tapers and is provided with a hatch cover 56 which can be swung open to empty the perlite from the storage bin 54. Extending down from the centre of the cylindrical upper portion 44 of the separator is an exit tube 58 to carry off the gases of combustion and the fine dust produced during the process of expansion. This exit tube is connected to a horizontal tube 60 which is coupled to a suction fan 62 which ensures an adequate draught throughout the plant. A draught regulating damper 64 is provided in the tube 60 upstream from the suction fan 62. In order to get rid of the fine dust which was carried out of the perlite separator with the burnt gases, a second separator unit 65 of similar construction to the first separator unit 39 is connected to the outlet pipe 66 from the suction fan 62. Fine dust and particles is connected at the bottom of this second separator unit 65 and passed to a storage bin (not shown) through a valve 67. The burnt gases finally pass up a chimney 68 to be exhausted into the atmosphere.

In a modified form, the suction fan 62 can be installed behind the separator unit 65, at the bottom of the chimney 68.

The operation of the plant will now be briefly described. The crushed rock is carried to the plant by means of the conveyor belt 34 or an elevator. It drops into the hopper 14 and is held therein if the feed mechanism 32 at the bottom thereof is inoperative. The feed mechanism 32 controls the quantity of rock fed to the processing chamber 12. It feeds the crushed rock to the spiral tube 26. As the rock slides down the spiral tube 26 it is preheated by means of the heat inside the expansion tube 16. It issues into the centre of the steel tube 16 somewhat above the hottest zone in the expansion chamber 12. During its downwards fall against the rising conditioned burnt gases, it expands rapidly until its specific gravity has fallen to such a low valve that it is carried upwards with the gases. Any rock which is unsuitable for expansion and dross drops right through the processing chamber and is collected below the burner 10 by means of a centrally placed funnel (not shown). The expanded perlite passes up the expansion tube 16 and along to the separating unit 39. There it swirls around the upper portion 44 of the separator tangentially gradually being cooled and is collected at the bottom thereof and is passed to the storage bin 54. The fine dust passes out of the separator and much of it can be separated in the second separator 65, so that the gases passing up the chimney 68 are substantially free from dust.

What I claim and desire to secure by Letters Patent is:

1. A furnace for the processing of volcanic rock including in combination a burner for producing a combustible conditioned atmosphere; a vertical processing chamber in the form of a long tube open at the top and bottom up through which the burning gases pass from the burner; a plurality of slits in the wall of the processing chamber, said slits being arranged in a line along the length thereof; at least two casings surrounding the processing chamber; heat insulating material located between the casings, a hopper containing the crushed volcanic rock to be processed, crushed rock conveying means located between said hopper and a point in the processing chamber intermediate the ends thereof and passing through said casings, means for preheating the crushed rock whilst in said conveying means and means for extracting the expanded rock from the burnt gases.

2. A furnace according to claim 1 wherein said crushed rock conveying means and preheating means consists of a spiral tube in contact with the walls of the two innermost casings.

3. A furnace according to claim 1 wherein the processing chamber is surrounded by three casings, the inner two of which are concentric and cylindrical, and the outermost one of which has a square cross-section said heat insulating material being located between the middle and outer casings, and said preheating means being located between the middle and inner casings.

4. A furnace according to claim 1 wherein the burner is mounted on a platform underneath the lower end of the processing chamber, which is tapered to a nozzle thereby forming an inverted cone means being provided to raise or lower the platform with respect to the lower end of the combustion chamber in order to control the rate of combustion and thereby the degree of expansion of the volcanic rock.

5. A furnace according to claim 1 wherein the means for extracting the expanded rock from the burnt gases comprises two separator units in series with the flow of burnt gases, the good quality expanded volcanic rock being separated in the first unit and the fine dust and over expanded volcanic rock being separated in the second unit; and inlet pipe and control damper located upstream of the first separator unit for introducing a predetermined quantity of cold air into the burnt gases before they enter the first separator unit; and a suction fan and draught regulating valve positioned in the pipe joining the first and second separator units, the valve being located upstream from the suction fan.

References Cited

UNITED STATES PATENTS

| | | |
|---|---|---|
| 2,431,884 | 12/1947 | Neuschotz. |
| 2,572,484 | 10/1951 | Howle et al. |
| 2,612,263 | 9/1952 | Slavick. |
| 2,666,632 | 1/1954 | Culver et al. |
| 2,782,018 | 2/1957 | Bradford. |
| 3,206,905 | 9/1965 | Weavering et al. |

JOHN J. CAMBY, Primary Examiner

U.S. Cl. X.R.

252—378